Patented Mar. 5, 1935

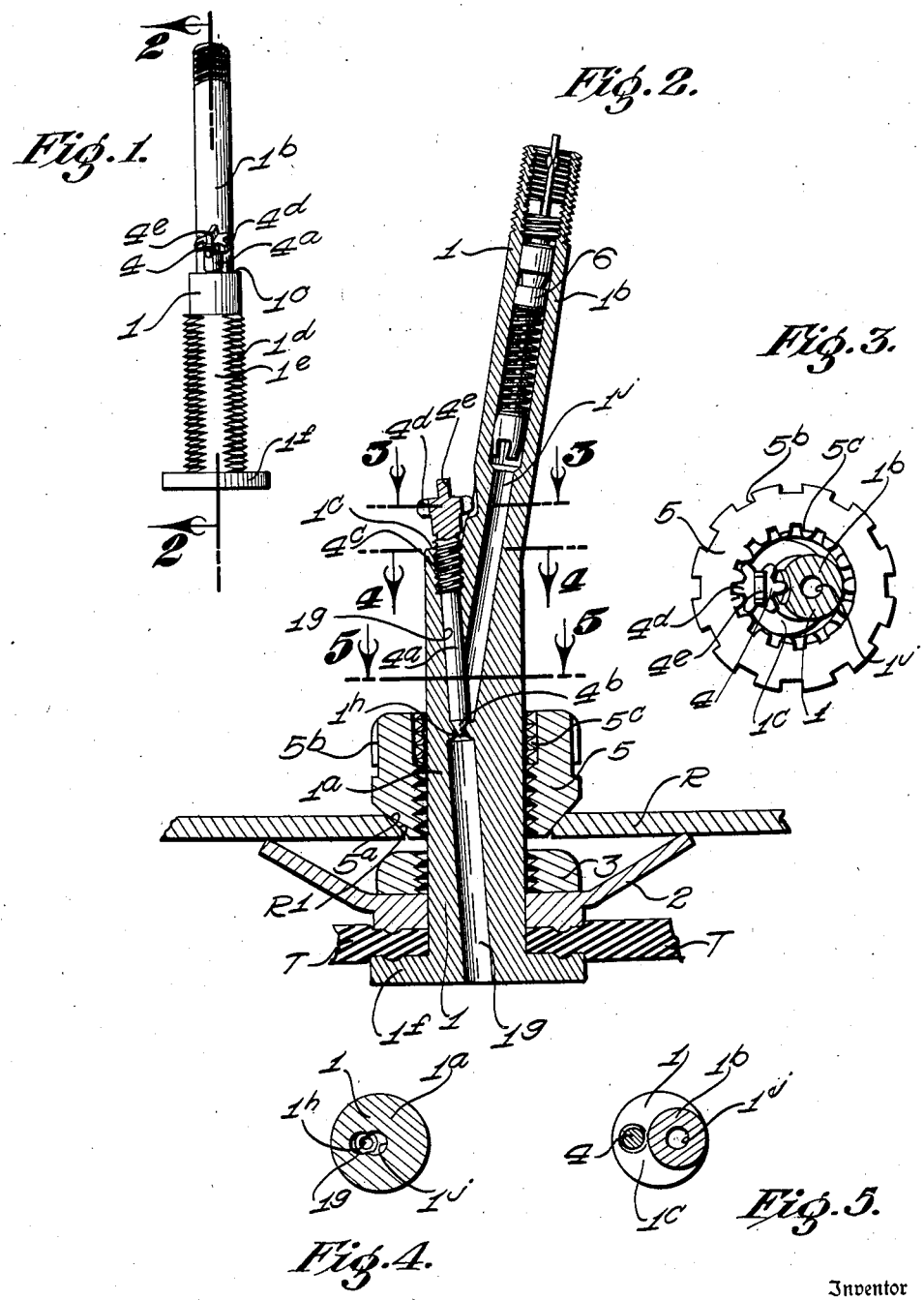

1,993,227

UNITED STATES PATENT OFFICE 1,993,227

PNEUMATIC TIRE VALVE STEM AND VALVE

Clarence S. Preston, San Diego, Calif.

Application January 16, 1932, Serial No. 587,043

3 Claims. (Cl. 152—12)

My invention relates to tire valve stems and valves and the objects of my invention are:

First, to provide a device of this class which provides both a check valve and a positively acting valve designed to seal the tire while in use;

Second, to provide a device of this class in which the positive acting valve may be readily and quickly removed so as to permit the air to be quickly discharged from a tube Third, to provide a device of this class which may be used in conjunction with practically any make of tire or tire rim;

Fourth, to provide a device of this class which positively protects the tube against loss of air due to a leaking check valve;

Fifth, to provide a device of this class which incorporates a novel means of turning the positively acting valve against its seat with sufficient force to prevent accidental dislodgement, it being accomplished by the centering nut used to position the valve stem with respect to the tire rim; and Sixth, to provide on the whole a novelly constructed tire valve stem and valve which is particularly simple of construction proportional to its functions, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which forms a part of this application, in which:

Figure 1 is an elevational view of my tire valve stem and valve as it appears removed from the tire and with the centering nut omitted; Fig. 2 is an enlarged sectional view through 2—2 of Fig. 1 showing fragmentarily the adjacent portions of the tube and rim together with the tube clamping means and tire valve stem centering nut and with parts and portions in elevation to facilitate the illustration; Fig. 3 is a transverse sectional view through 3—3 of Fig. 2 showing the centering nut in its coacting relation with the positively acting valve; Fig. 4 is a transverse sectional view through 4—4 of Fig. 2; and Fig. 5 is another transverse sectional view through 5—5 of Fig. 2 with the positively acting valve omitted.

Similar characters of reference refer to similar parts and portions throughout the several views of the drawing.

Body element 1, clamp member 2, locking nut 3, needle valve 4, centering nut 5, and check valve 6 constitute the principal parts and portions of my novel tire valve stem and valve.

The tire valve stem and valve includes a body element 1 of approximately the same length and diameter as the conventional valve stem. The body element 1 is provided with a lower portion $1a$ of larger diameter and an upper portion $1b$ of smaller diameter. The upper portion $1b$ is disposed in eccentric relation with the lower or larger diameter portion $1a$ so as to form therewith a shoulder or ledge $1c$. The larger diameter portion $1a$ is provided with external screw threads $1d$ interrupted by flattened portions $1e$. The lower or inner ends of the larger diameter portion $1a$ is provided with a clamping flange $1f$ which coacts with a clamp member 2. In order to secure a tube T the clamp member is held in position by means of a lock nut 3 screwable upon the body element.

The larger diametered portion $1a$ of the valve stem is provided with a bore $1g$ which extends upwardly in angular relation with the axis of the stem so as to intersect the ledge $1c$. The upper portion of the bore $1g$ is internally threaded. The bore $1g$ is provided with a constriction intermediate its ends forming a valve seat $1h$. Above the valve seat $1h$ the bore $1g$ is adapted to receive a needle valve 4 comprising a valve stem $4a$ pointed at its lower end designated $4b$. The upper portion of the valve stem is provided with screw threads $4c$. The extended portion or exposed portion of the needle valve forms a small pinion gear portion $4e$ which facilitates turning by one's fingers and also permits engagement with the gear portion of a centering nut 5. In addition the extended end of the needle valve is provided with a key lug $4f$.

The smaller diametered portion $1a$ of the body element is disposed in more or less angular relation with the larger diameter portion $1a$ and is provided with a bore $1j$ which extends into the larger diametered portion $1a$ and intersects the bore $1g$ above the valve seat $1e$. The bore $1j$ is adapted to receive in its upper portion a check valve 6 on any suitable design, the extended portion of the smaller diametered portion $1b$ being internally and externally threaded in a manner similar to the conventional valve stem.

The centering nut 5 previously referred to is adapted to screw upon the thread $1d$ of the larger diametered portion $1a$. The lower end of the centering nut 5 is beveled as indicated by $5a$ so as to engage an opening R1 provided in a tire rim R. The upper external portion of the centering nut is knurled as indicated by 5b. Inside the upper portion the screw threads are intersected by longitudinally extending slots 5c which divide the screw threads into a plurality of teeth adapted to engage the pinion gear portion 4d of the needle valve. The screw threads 1d do not extend the full length of the larger diametered portion 1a but terminate a sufficient distance below the ledge 1c so that the centering nut is free therefrom when in engagement with the pinion gear portion 4d. The centering nut is shown in such engagement in Fig. 3. When desiring to fill the tire with air, the needle valve 4 is unscrewed from the seat 1h so as to allow air to flow into the tire from the bore 1j. When the required pressure has been obtained, the needle valve is again screwed into the seat 1h so as to prevent any leakage out of the check valve 6. If it is desired to quickly remove the air from the tube, the needle valve is removed from the bore 1g so as to by-pass the air.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a tire valve stem and valve, a body element including a bore therethrough, a check valve at the outer portion of said body element, a valve seat intermediate the ends of said bore, a positively acting valve intermediate the ends of said body element arranged to coact with said valve seat, a centering nut screwably mounted upon said body element, and means carried by said centering nut for engaging and actuating said positively acting valve when said centering nut is raised to the proper position.

2. In a tire valve stem and valve, a body element including a bore therethrough, a check valve at the outer portion of said body element, a valve seat intermediate the ends of said bore, a positively acting valve arranged to coact with said valve seat, a handle for said valve protruding from said body element intermediate the ends thereof, a centering nut screwably mounted upon said body element, and means carried by said centering nut for engaging and actuating said positively acting valve when said centering nut is raised to the proper position.

3. In a tire valve stem and valve, a body element including a bore extending therethrough, a check valve at the outer portion of said bore, a screwably mounted needle valve arranged to seal said bore intermediate its ends, clamp means associated with the inner end of said body element for attaching said body element to a pneumatic tube, a centering nut screwably mounted upon said body element, and tooth means in said centering nut for engaging and actuating said needle valve when said centering nut is raised to the proper position.

CLARENCE S. PRESTON.